(12) United States Patent
Suh et al.

(10) Patent No.: US 8,368,601 B2
(45) Date of Patent: Feb. 5, 2013

(54) MULTIPROTOCOL ANTENNA STRUCTURE AND METHOD FOR SYNTHESIZING A MULTIPROTOCOL ANTENNA PATTERN

(75) Inventors: Seong-Youp Suh, San Jose, CA (US); Salih Yarga, Columbus, OH (US); Anand S Konanur, Sunnyvale, CA (US); Songnan Yang, San Jose, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 12/536,132

(22) Filed: Aug. 5, 2009

(65) Prior Publication Data

US 2011/0032157 A1    Feb. 10, 2011

(51) Int. Cl.
*H01Q 1/24* (2006.01)
*H01Q 5/00* (2006.01)
(52) U.S. Cl. .................... 343/702; 343/700 MS
(58) Field of Classification Search .......... 343/702, 343/700 MS, 846
See application file for complete search history.

(56) References Cited

U.S. PATENT DOCUMENTS

| | | | |
|---|---|---|---|
| 5,418,543 | A | 5/1995 | Bolton |
| 7,095,374 | B2 | 8/2006 | Chen et al. |
| 7,864,116 | B2 | 1/2011 | Kurashima et al. |
| 8,059,039 | B2 * | 11/2011 | Ayala Vazquez et al. ..... 343/702 |
| 2004/0196187 | A1 | 10/2004 | Yeh |
| 2006/0066487 | A1 | 3/2006 | Park et al. |
| 2008/0287171 | A1 | 11/2008 | Qi et al. |
| 2009/0174608 | A1 | 7/2009 | Park et al. |
| 2010/0060526 | A1 * | 3/2010 | Cheng ................ 343/700 MS |
| 2010/0201578 | A1 * | 8/2010 | Parsche ............... 343/700 MS |
| 2011/0025566 | A1 | 2/2011 | Suh et al. |

FOREIGN PATENT DOCUMENTS

| | | |
|---|---|---|
| EP | 100909656 B1 | 7/2009 |
| WO | WO-2011014378 A2 | 2/2011 |
| WO | WO-2011016976 A2 | 2/2011 |

OTHER PUBLICATIONS

"International Application Serial No. PCT/US2010/042396 , Search Report and Written Opinion mailed Feb. 24, 2011", 5 pgs.

(Continued)

*Primary Examiner* — Jacob Y Choi
*Assistant Examiner* — Hasan Islam
(74) *Attorney, Agent, or Firm* — Schwegman, Lundberg & Woessner, P.A.; Gregory J. Gorrie (57) ABSTRACT

Embodiments of a planar asymmetric antenna structure with shifted feed position for multi-protocol operations are disclosed The antenna structure includes two elliptically tapering right and left arms, each with a different radius, and an off-center feed point positioned between the right and left arms. One arm has a smaller elliptical tapering than the other arm and the feed point is positioned closer to one arm than the other arm. A method of synthesizing a multiprotocol antenna pattern is also disclosed. The method includes providing substantially equally surface currents on both arms of an antenna structure to generate a near-horizontal pattern in far-field at a lower frequency band, providing greater surface currents on the right arm to generate a far-field pattern with a large horizontal component at a higher frequency band, and providing greater surface currents on the left arm to generate an asymmetric far-field pattern at a middle frequency band.

18 Claims, 8 Drawing Sheets

OTHER PUBLICATIONS

"International Application Serial No. PCT/US2010/042424, Search Report and Written Opinion mailed Feb. 25, 2011", 9 pgs.

"U.S. Appl. No. 12/533,140, Non Final Office Action mailed Dec. 15, 2011", 6 pgs.

"U.S. Appl. No. 12/533,140, Response filed Apr. 16, 2012 to Non Final Office Action mailed Dec. 15, 2011", 11 pgs.

"International Application Serial No. PCT/US2010/042396, International Preliminary Report on Patentability mailed Feb. 16, 2012", 5 pgs.

"U.S. Appl. No. 12/533,140, Final Office Action mailed Jun. 15, 2012", 10 pgs.

* cited by examiner

FIG. 5 FLAT PANEL DISPLAY WITH INTEGRATED ANTENNA STRUCTURES

FIG. 6

MULTIPROTOCOL ANTENNA STRUCTURE AND METHOD FOR SYNTHESIZING A MULTIPROTOCOL ANTENNA PATTERN

TECHNICAL FIELD

Embodiments pertain to multiprotocol antennas and antenna structures. Some embodiments pertain to flat panel displays with integrated multiprotocol antennas. Some embodiments pertain to portable computing devices, such as a laptop, notebook and netbook computers, with integrated antennas configured to communicate with different protocol wireless network base stations and access points.

BACKGROUND

Portable computing and communication devices, such as laptop, notebook and netbook computers, are generally configured with wireless capability and include one or more internal antennas to communicate with access points or base stations. These internal antennas generally provide an antenna pattern with similar gain in both vertical and horizontal directions. Since access points and base stations are generally located in a more horizontal direction, much of the gain of these antennas is wasted in the vertical direction. An internal antenna with an increased gain in the horizontal direction and reduced gain in the vertical direction (i.e., a more donut shaped radiation pattern) would be more suitable for use in portable computing and communication devices, however conventional antennas are generally unable to provide such a radiation pattern due to form factor restrictions. Furthermore, these conventional antennas are generally unable to support a multi-protocol system (e.g., WiMAX and WiFi).

Thus, there are general needs for multiprotocol antenna structures suitable for use in flat panel displays and other planar devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
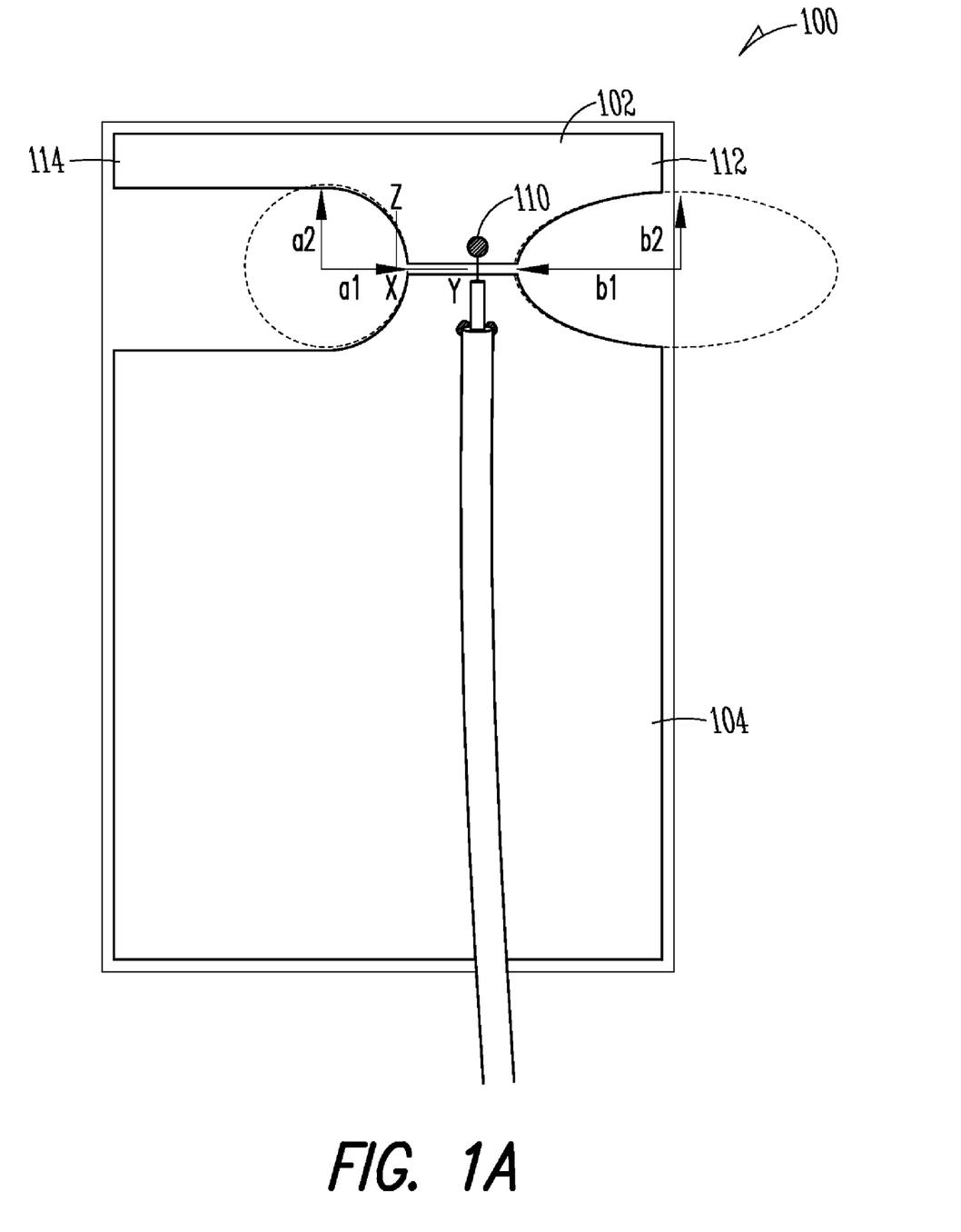
FIG. 1A is a front view of a multi-protocol antenna structure in accordance with some embodiments.

FIG. 1A is a front view of a multi-protocol antenna structure in accordance with some embodiments. Antenna structure 100 is an asymmetric planar antenna with shifted feed position suitable for multi-protocol operations. The antenna structure 100 comprises two elliptically tapering arms, right arm 112 and left arm 114, each with a different radius. The antenna structure 100 also includes an off-center feed point 110 positioned between the right and left arms.

In the example illustrated in FIG. 1A, the right arm 112 has a smaller elliptical tapering than the left arm 114 and the feed point 110 is positioned closer to the right arm 112 than the left arm 114. In these embodiments, the left and right arms comprise conductive material disposed on a planar non-conductive substrate. The position of the off-center feed point 110 and the different radii of the left and right arms may be selected to provide a resonance within two or more frequency bands to support multiprotocol operation. In some embodiments, the non-conductive substrate is a flexible polyethylene terephtalate (PET) substrate.

Figure 1B:
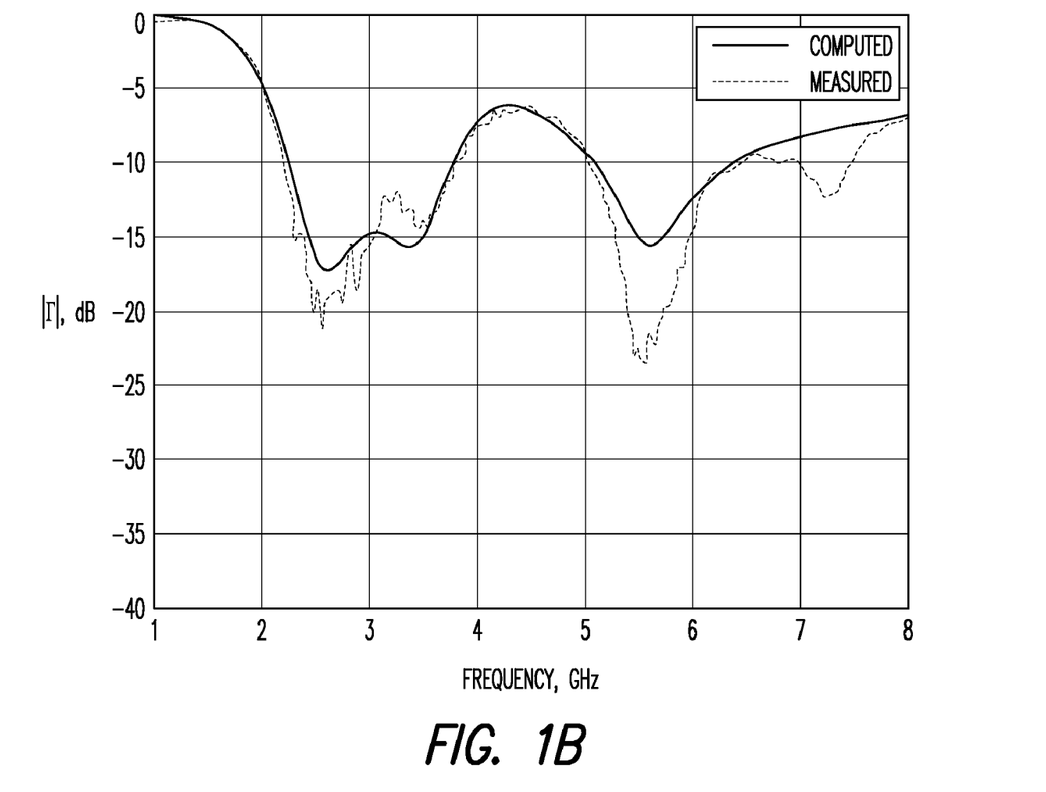
FIG. 1B is a comparison between computed and measured return loss for the multi-protocol antenna structure of FIG. 1A.

FIG. 1B shows the return loss of the multi-protocol antenna structure 100 indicating that the actual antenna structure agrees well with the simulated results. The multi-protocol antenna structure 100 has a low-profile that can be integrated in most of notebook/netbook devices.

Figure 2A:
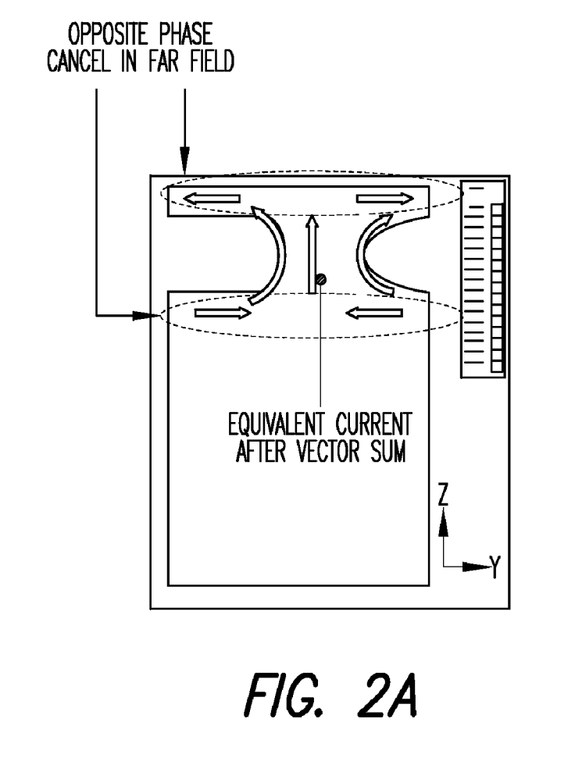
FIGS. 2A-2C illustrate surface currents of the multi-protocol antenna structure of FIG. 1A at frequencies of different frequency bands.
Figure 2B:
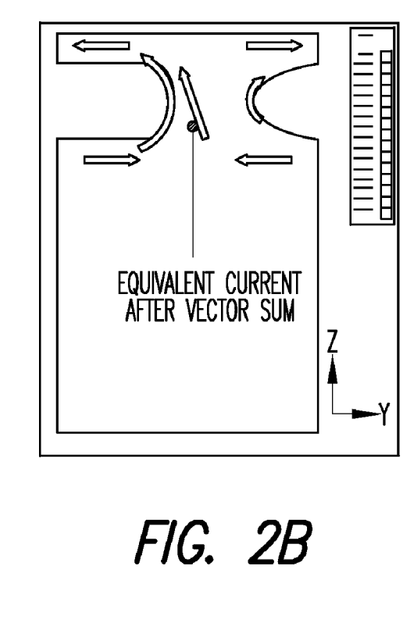
Figure 2C:
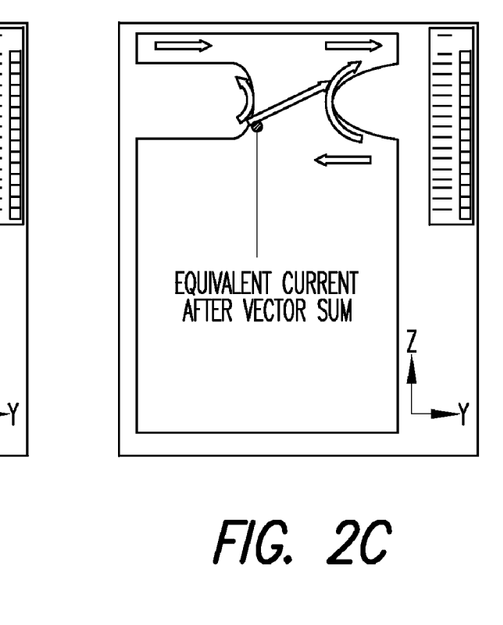

In some embodiments, the off-center feed point 110 and the different radii of the arms are selected to provide substantially equally surface currents on both arms to generate a near-horizontal pattern in the far-field for a lower frequency band, as shown in FIG. 2A. The off-center feed point 110 and the different radii of the arms may be selected to provide greater surface currents on the left arm 114 than on the right arm 112 to generate an asymmetric far-field pattern at a middle frequency band as shown in FIG. 2B. Furthermore, the off-center feed point 110 and the different radii of the arms may also be selected to provide greater surface currents on the right arm 112 than on the left arm 114 to generate a far-field pattern with a larger horizontal component at a higher frequency band as shown in FIG. 2C.

The two elliptically tapering arms (i.e., the right arm 112 than the left arm 114) are part of an upper radiating element 102. A lower radiating element 104 operates as a ground plane with corresponding elliptically tapered portions opposite the elliptically tapered right and left arms of the upper radiating element 102. The off-center feed point 100 may be provided between the upper and lower radiating elements as illustrated.

Figure 3A:
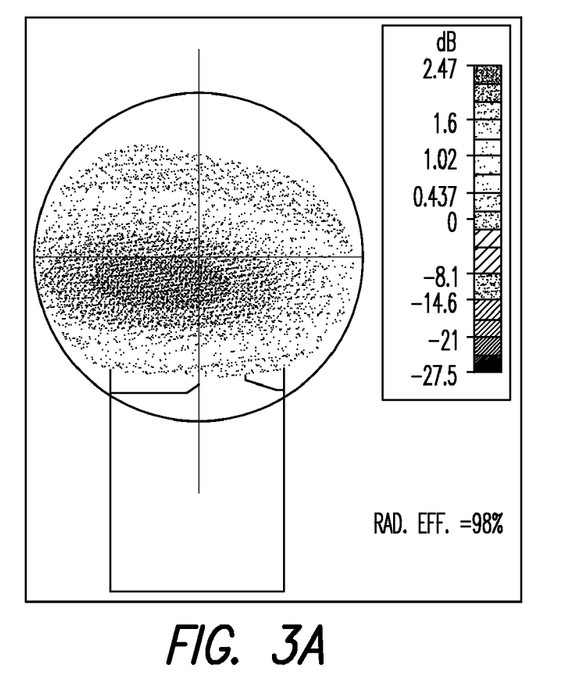
FIGS. 3A-3C illustrate elevation patterns of the multi-protocol antenna structure of FIG. 1A at frequencies of different frequency bands.
Figure 3B:
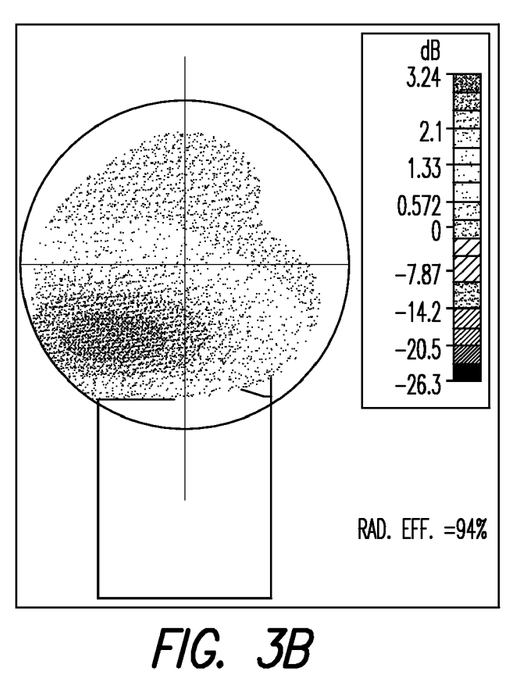
Figure 3C:
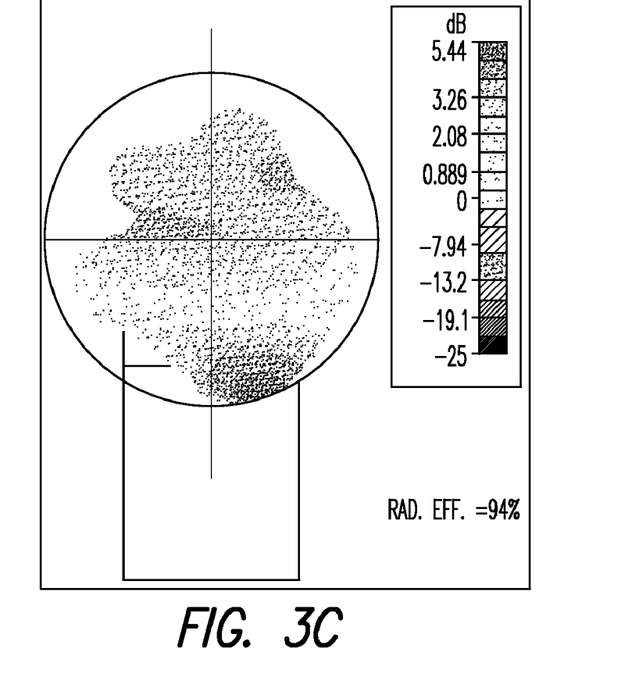

Embodiments of the multi-protocol antenna structure 100 provide an antenna design for a multi-protocol antenna solution. The multi-protocol antenna structure 100 may be suitable for both WiMAX and WiFi applications, although the scope of the embodiments is not limited in this respect. The multi-protocol antenna structure 100 provides multi-band functionality with optimized patterns at each frequency band by synthesizing the current distribution on the planar antenna surface. The surface current distributions at different frequencies are illustrated in FIGS. 2A, 2B and 2C. Embodiments are extendable to other wireless applications and protocols including combinations of wireless wide-area network (WWAN) applications, WiMAX applications, Long-Term Evolution (LTE) applications, ultra-wide-band (UWB) applications, and wireless-fidelity (WiFi) applications. The multi-protocol antenna structure 100 illustrated in FIG. 1A may be suitable for WiMAX and WiFi frequency bands (2.3~2.7, 3.3~3.8, and 5.15~5.825 GHz) with a single feed. The multi-protocol antenna structure 100 may provide near-horizon patterns at two of the WiMAX bands of 2.3~2.7 and 3.3~3.8 GHz and may provide WiFi compatible patterns at the higher WiFi frequency band of 5.15~5.825 GHz, as illustrated in FIGS. 3A, 3B and 3C. The near-horizon pattern at the lower band of WiFi (2.4~2.5 GHz) minimizes impact on the WiFi performance. At the edge of a WiFi link, the near-horizon pattern may increase the throughput over that of conventional WiFi antennas.

In accordance with embodiments, multiple modes of radiation at multiple different frequencies of interest are created for multi-band operations to provide a donut-shaped near-horizon pattern within the WiMAX band with a high radiation efficiency. A donut-shaped antenna pattern is not common with traditional antenna designs in notebook/netbook applications due to, among other things, form factor restrictions. The multi-protocol antenna structure 100 incorporates the physical and electrical issues associated with notebook and netbook device applications.

The multi-protocol antenna structure 100 is a planar design printed on a substrate with a compact and low-profile structure and includes a top radiating section and a lower ground plane. In some embodiments, antenna structure 100 may have dimensions of 29 mm(w)×40 mm(h)×0.25 mm(t). The lower ground plane may help determine impedance matching. In some embodiments, the ground plane section may be located behind or underneath the LCD display of these devices. These embodiments are described in more detail below.

The elliptical tapering of the left and right arms with different radii may provide multiple resonates at different frequencies for multi-protocol operation. The feed position, which may be shifted toward the smaller elliptical tapering of the right arm 112 also helps provide for multiprotocol operations. The size, shape and location of the elliptical tapering may be altered depends on frequency bands of interests and bandwidths.

In some embodiments, at a lower frequency range (e.g., 2.3~2.7 GHz), currents are distributed at both arms. The currents on each arms have similar magnitude but have opposite phase and therefore the equivalent current may be illustrated as short vertical component as shown in FIG. 2A. This provides near-horizon pattern in far-field as shown in FIG. 3A. At a mid-frequency range (e.g., 3.3~3.8 GHz), a larger current is distributed on the left arm 114 with the larger elliptical tapering than on the right arm 112. The equivalent current is skewed to side of the left arm 114 as shown in FIG. 2B providing an asymmetric radiation pattern in far-field as shown in FIG. 3B. At a higher frequency (e.g., 5.15~5.825 GHz), greater current is distributed at the right arm 112 with the smaller elliptical tapering than on the left arm 114. The equivalent current is shown in FIG. 2C with a larger horizontal component and the far-field pattern is plotted in FIG. 3C. The current distributions show that synthesizing the current on the antenna surface determines the far-field by the size, shape and location of the tapering.

Figure 4A:
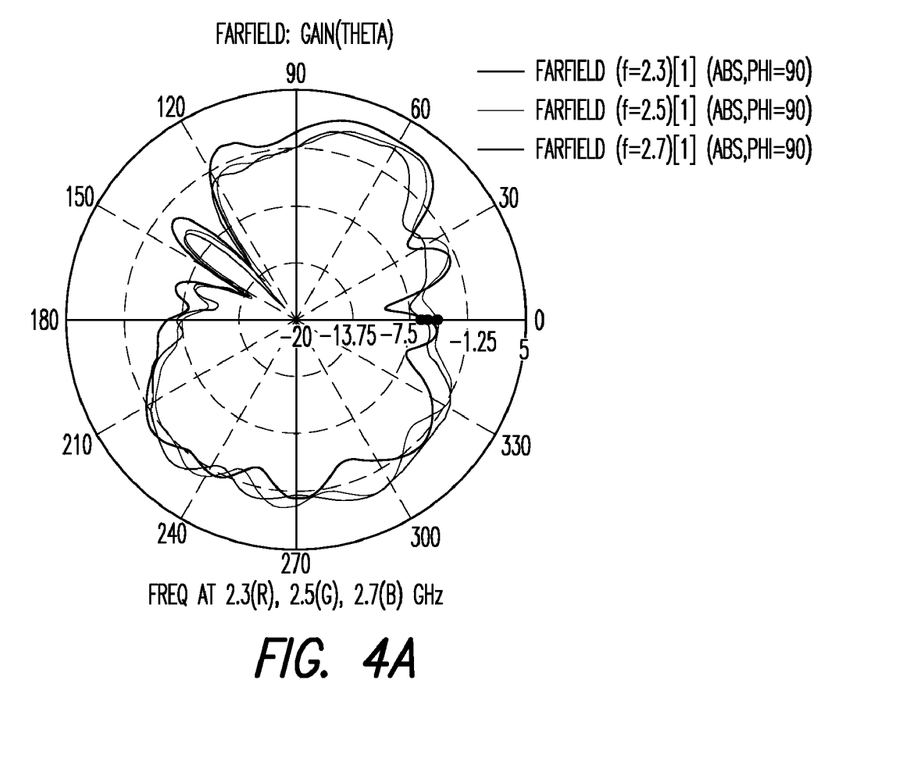
FIGS. 4A-4C illustrate two-dimensional antenna patterns of the multi-protocol antenna structure of FIG. 1A at frequencies of different frequency bands.
Figure 4B:
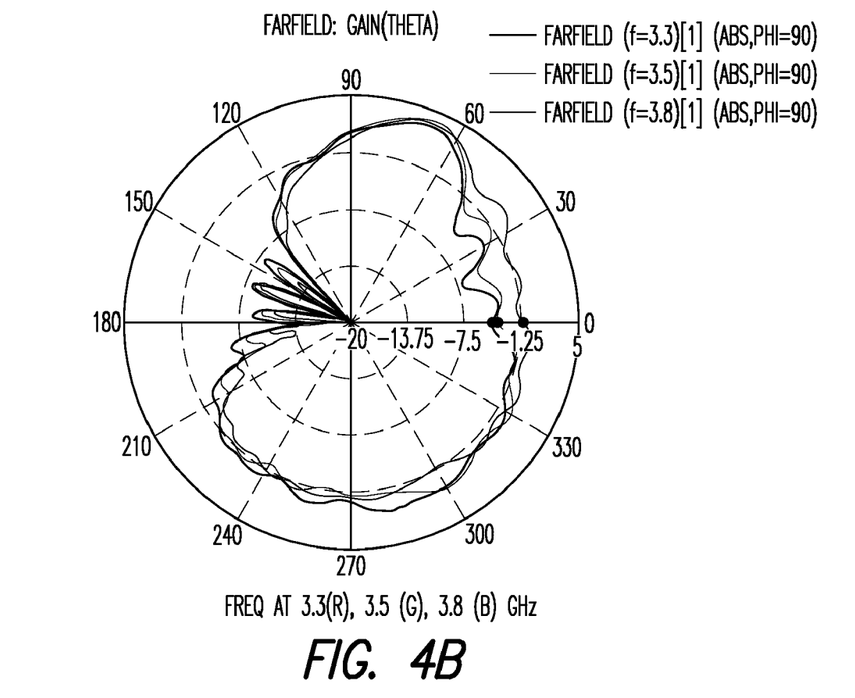
Figure 4C:
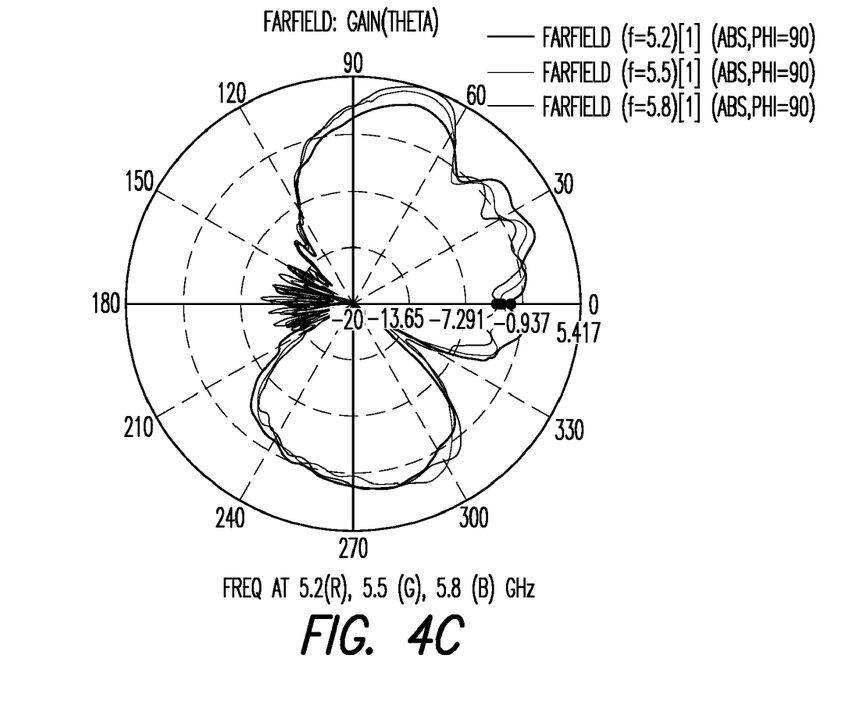

Because antenna structure 100 is an asymmetric structure with a shifted feed position, there is not always perfect current cancellation between the two arms of the top radiating element 102. At lower frequencies, most of current is concentrated on the vertical feed location and the vector sum of current distribution provides relatively a short vertical current. The short vertical current component provides donut-shape near-horizon pattern as shown in FIG. 3A. The antenna structure 100 provides very good radiation efficiency at the bands of interest. As frequency increases, the vector sum of the current distribution no longer provides a short vertical current component, but rather a skewed component with a larger magnitude horizontal component. The pattern becomes more random pattern at higher frequencies (e.g., 5.15~5.825 GHz) but which is acceptable for WiFi applications. At mid frequencies, the patterns are not near-horizon pattern but are acceptable for WiMAX applications. The patterns may improve when the antenna is integrated in netbook computer, for example, due to a constructive coupling with metal environment especially at the mid-band and the higher band. FIGS. 4A-4C show the two-dimensional patterns of the antenna structure 100 with improved patterns especially at the mid-band and higher band after antenna integration in netbook computer.

In some embodiments, the multi-protocol antenna structure 100 provides multi-band capability with near-horizon patterns in the same foot print of the single band antenna. The form factor and cost is the same as that of a single band antenna but with multi-protocol capability.

In some embodiments, a desired far-field can be achieved by synthesizing the current distribution by modifying the tapering structure. These embodiments provide a method of synthesizing a multiprotocol antenna pattern. The method includes providing substantially equally surface currents on both arms of an antenna structure to generate a near-horizontal pattern in far-field at a lower frequency band, providing greater surface currents on the right arm 112 to generate a far-field pattern with a large horizontal component at a higher frequency band, and providing greater surface currents on the left arm 114 to generate an asymmetric far-field pattern at a middle frequency band.

Figure 5:
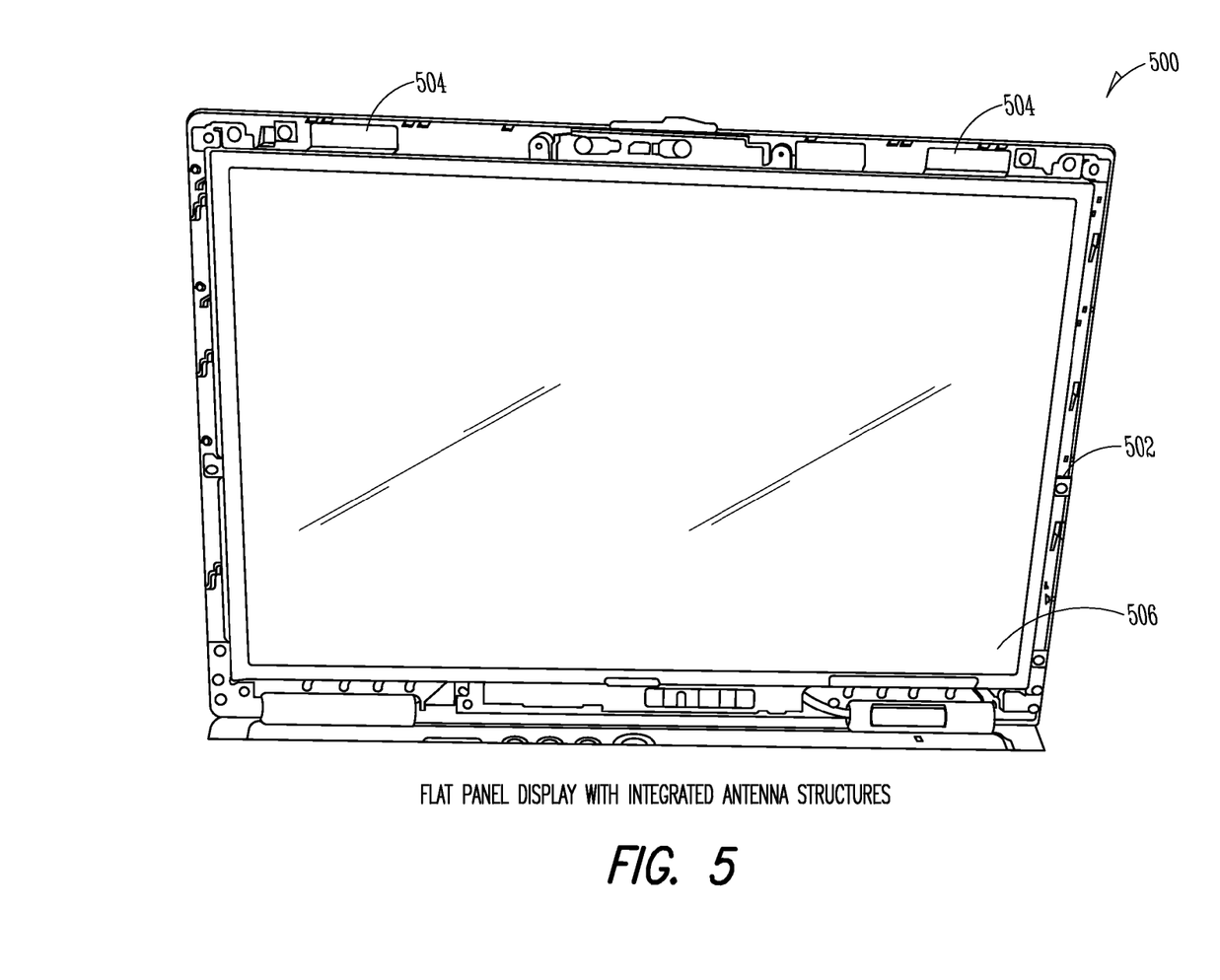
FIG. 5 is a flat panel display with integrated antenna structures in accordance with some embodiments.

FIG. 5 is a flat panel display with integrated antenna structures in accordance with some embodiments. Flat panel display 500 comprises a housing 502, a flat display area 506, and one or more antenna structures 504 provided within the housing 502. Antenna structure 100 (FIG. 1A) may be suitable for use as each of the antenna structures 504. In some embodiments, at least part of the ground planes of the antenna structures 504 is located behind the flat display area 506. When the flat display area 506 is positioned vertically, the upper radiating element 102 is located above the display area 506. The plane of the flat display area 506 and the planar surface 106 of the antenna structure are substantially parallel, and the ground planes of the antenna structures 504 may be electrically isolated from the ground plane of the display area 506. In some embodiments, a thin-sheet insulator may be included to electrically isolate the ground plane of the antenna structure 504 from the ground plane of the display area 506.

In some embodiments, the flat panel display 500 may include two or more of the antenna structures 504 configured to operate in accordance with a multiple-input multiple output (MIMO) communication technique. In some alternate embodiments, the two or more of the antenna structures 504 may be configured or positioned to operate as a phased array or in diversity mode, although the scope of the embodiments is not limited in this respect.

In some embodiments, the flat panel display 500 may be a stand-along display. In these embodiments, flat panel display 500 may, for example, serve as a display for a desktop computer or television. In some other embodiments, the flat panel display 500 may be a part of a portable communication device (e.g., a notebook or netbook computer, a wireless telecommunication device). In some embodiments, the flat display area 506 may comprise a liquid-crystal display (LCD), although other types of flat display areas are also suitable.

In some embodiment, a notebook computer with the integrated antenna structures 504 is provided. The notebook computer may comprise the flat panel display 500 having the housing 502, the flat display area 506, and the one or more antenna structures 504 provided within the housing 502. The notebook computer may also include a wireless transceiver coupled to the one or more antenna structures 504. In some embodiments, the notebook computer may be a wireless communication device such as a netbook computer configured primarily for wireless network communications and may primarily rely on online applications, although the scope of the embodiments is not limited in this respect. These embodiments are described in more detail below.

Figure 6:
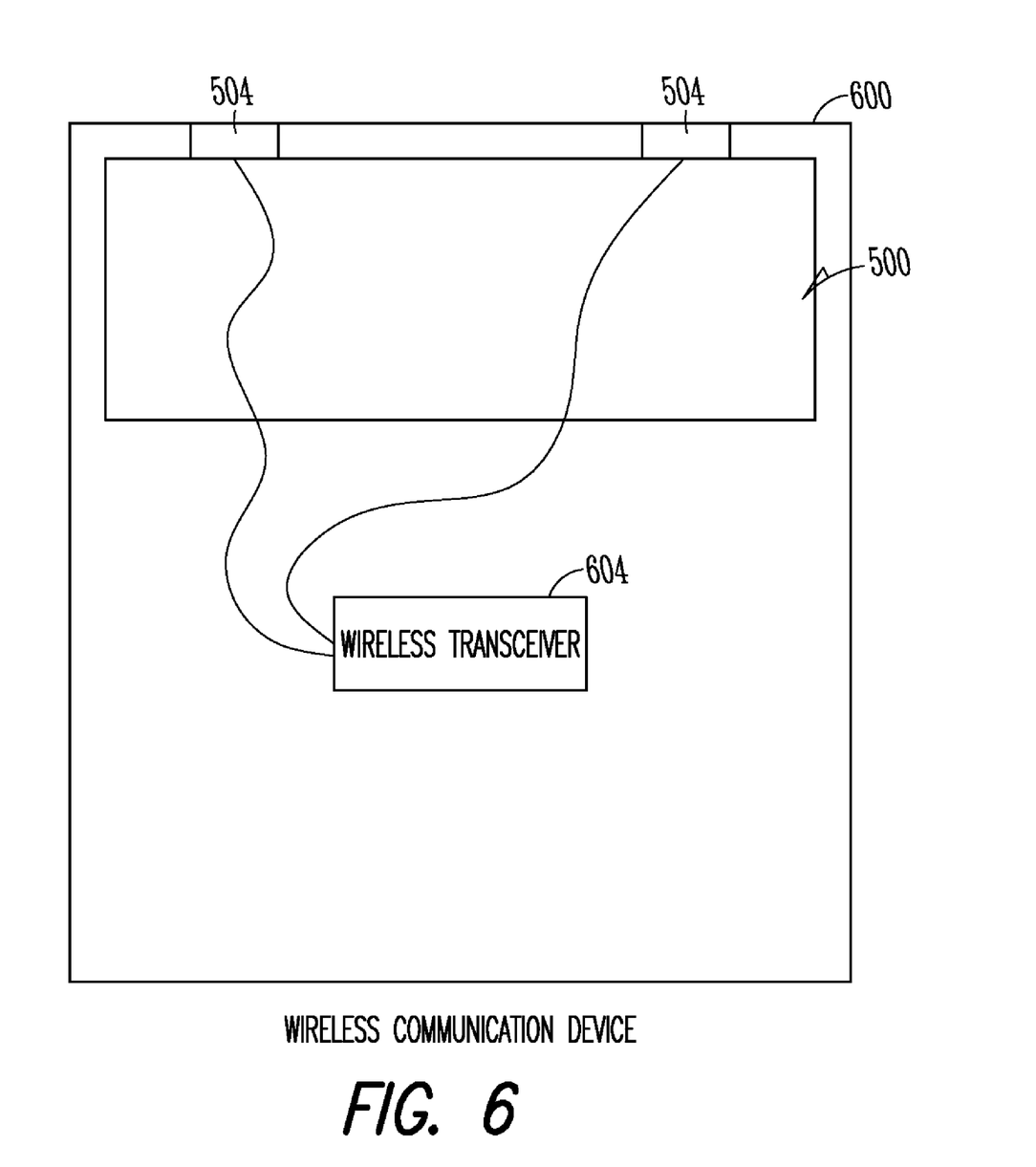
FIG. 6 is a block diagram of a wireless communication device in accordance with some embodiments.

FIG. 6 is a block diagram of a wireless communication device in accordance with some embodiments. Wireless communication device 600 may include wireless transceiver 604, one or more antenna structures 504 and a flat panel display 500. Wireless communication device 600 may be almost any device configured for wireless communication, such as a personal digital assistant (PDA), a laptop or portable computer with wireless communication capability, a notebook or netbook computer, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the wireless transceiver 604 may be configured to communicate orthogonal frequency division multiplexed (OFDM) communication signals over a multicarrier communication channel. The OFDM signals may comprise a plurality of orthogonal subcarriers. In some of these multicarrier embodiments, the wireless transceiver 604 may be part of a wireless local area network (WLAN) communication station such as a wireless access point (AP), base station or a mobile device including a Wireless Fidelity (WiFi) device. In some broadband multicarrier embodiments, the wireless transceiver 604 may be part of a broadband wireless access (BWA) network communication station, such as a Worldwide Interoperability for Microwave Access (WiMAX) communication station. In some other broadband multicarrier embodiments, the wireless transceiver 604 may be a 3rd Generation Partnership Project (3GPP) Universal Terrestrial Radio Access Network (UTRAN) Long-Term-Evolution (LTE) or a Long-Term-Evolution (LTE) communication station, although the scope of the embodiments is not limited in this respect. In these broadband multicarrier embodiments, the wireless transceiver 604 may be configured to communicate in accordance with an orthogonal frequency division multiple access (OFDMA) technique.

In some embodiments, the wireless transceiver 604 may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the embodiments is not limited in this respect as they may also be suitable to transmit and/or receive communications in accordance with other techniques and standards. In some embodiments, the wireless transceiver 604 may be configured to communicate signals in accordance with the IEEE 802.16-2004 and the IEEE 802.16(e) standards for wireless metropolitan area networks (WMANs) including variations and evolutions thereof, although the scope of the embodiments is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

In some other embodiments, the wireless transceiver 604 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A planar asymmetric antenna structure with shifted feed position for multi-protocol operations, the antenna structure comprising:
    a single upper radiating element comprising two elliptically tapering right and left arms, each with a different radius and directed away from each other in opposite directions;
    a single lower radiating element operating as a ground plane, the single lower radiating element having corresponding elliptically tapered portions opposite the elliptically tapered right and left arms of the single upper radiating element; and
    an off-center feed point positioned between the right and left arms and at a predetermined distance from each arm,
    wherein one arm has a smaller elliptical tapering than the other arm and the feed point is positioned closer to one arm than the other arm, and
    wherein at least a portion of an edge of at least one of the right and left arms and at least a portion of an edge of the corresponding elliptically tapered portion opposite the at least one right and left arms define a portion of a same ellipse.

2. The antenna structure of claim 1 wherein the right arm has a smaller elliptical tapering than the left arm.

3. The antenna structure of claim 2 wherein the feed point is positioned closer to the right arm than the left arm.

4. The antenna structure of claim 3 wherein the left and right arms comprise conductive material disposed on a planar non-conductive substrate.

5. The antenna structure of claim 4 wherein the position of the off-center feed point and the different radii of the left and right arms are selected to provide a resonance within two or more frequency bands.

6. The antenna structure of claim 5 wherein at a lower frequency band, the off-center feed point and the different radii of the left and right arms are selected to provide substantially equally surface currents on both arms to generate a near-horizontal pattern in far-field for the lower frequency band,
    wherein at a higher frequency band, the off-center feed point and the different radii of the left and right arms are selected to provide greater surface currents on the right arm than on the left arm to generate a far-field pattern with a large horizontal component, and
    wherein at a middle frequency band, the off-center feed point and the different radii of the left and right arms are selected to provide greater surface currents on the left arm than on the right arm to generate an asymmetric far-field pattern.

7. The antenna structure of claim 5 wherein the upper and lower radiating elements are disposed on a planar surface of a non-conductive substrate, the lower radiating element serving as a ground plane disposed on the planar surface,
wherein when the planar surface is positioned vertically, far-field effects of current flowing in opposite directions on the upper radiating element at least partially cancel and far-field effects of current flowing in opposite directions on the lower radiating element at least partially cancel to provide an antenna pattern with increased gain in horizontal directions and reduced gain in vertical directions.

8. The antenna structure of claim 7 wherein the non-conductive substrate comprises a printed circuit board,
wherein the upper and lower radiating elements are provided on a first side of the printed circuit board, and
wherein an opposite side of the printed circuit board is devoid of conductive material at least in regions opposite the upper radiating element.

9. The antenna structure of claim 8 wherein an antenna pattern provided by the antenna structure has an increased gain just above the horizon for at least one frequency band.

10. The antenna structure of claim 9 wherein the non-conductive substrate is a flexible polyethylene terephthalate (PET) substrate.

11. A flat panel display with integrated antenna structures comprising:
a housing; a flat display area; and one or more antenna structures,
wherein each of the one or more antenna structures comprises:
a single upper radiating element comprising two elliptically tapering right and left arms, each with a different radius and directed away from each other in opposite directions;
a single lower radiating element operating as a ground plane, the single lower radiating element having corresponding elliptically tapered portions opposite the elliptically tapered right and left arms of the single upper radiating element; and
an off-center feed point positioned between the right and left arms and at a predetermined distance from each arm,
wherein one arm has a smaller elliptical tapering than the other arm and the feed point is positioned closer to one arm than the other arm, and
wherein at least a portion of an edge of at least one of the right and left arms and at least a portion of an edge of the corresponding elliptically tapered portion opposite the at least one right and left arms define a portion of a same ellipse.

12. The flat panel display of claim 11 wherein a ground plane of the one or more antenna structures is provided at least partially behind the flat display area.

13. A wireless communication device comprising:
a display comprising a housing, a flat display area, and one or more antenna structures provided within the housing; and
a wireless transceiver coupled to the one or more antenna structures,
wherein the one or more antenna structures comprises:
a single upper radiating element comprising two elliptically tapering right and left arms, each with a different radius and directed away from each other in opposite directions;
a single lower radiating element operating as a ground plane, the single lower radiating element having corresponding elliptically tapered portions opposite the elliptically tapered right and left arms of the single upper radiating element; and
an off-center feed point positioned between the right and left arms and at a predetermined distance from each arm,
wherein one arm has a smaller elliptical tapering than the other arm and the feed point is positioned closer to one arm than the other arm, and
wherein at least a portion of an edge of at least one of the right and left arms and at least a portion of an edge of the corresponding elliptically tapered portion opposite the at least one right and left arms define a portion of a same ellipse.

14. The wireless communication device of claim 13 further comprising two of the antenna structures providing within the housing, wherein the wireless transceiver and the two antenna structures are configured for multiple-input multiple-output (MIMO) communications in accordance with an IEEE 802.16 standard.

15. The wireless communication device of claim 13 wherein a ground plane of the antenna structures is provided at least partially behind the flat display area.

16. A method of synthesizing a multiprotocol antenna pattern comprising:
providing substantially equally surface currents on a right arm and a left arm of an antenna structure to generate a near-horizontal pattern in far-field at a lower frequency band;
providing greater surface currents on the right arm to generate a far-field pattern with a large horizontal component at a higher frequency band; and
providing greater surface currents on the left arm to generate an asymmetric far-field pattern at a middle frequency band,
wherein the right arm has a smaller elliptical tapering than the left arm and a feed point is positioned closer to the right arm than the left arm and at a predetermined distance from each arm,
wherein the two elliptically tapering arms are part of a single upper radiating element and are directed away from each other in opposite directions,
wherein the antenna structure further comprises a single lower radiating element operating as a ground plane, the single lower radiating element having corresponding elliptically tapered portions directly opposite the elliptically tapered right and left arms of the single upper radiating element, and
wherein at least a portion of an edge of at least one of the right and left arms and at least a portion of an edge of the corresponding elliptically tapered portion opposite the at least one right and left arms define a portion of a same ellipse.

17. The method of claim 16 wherein the antenna structure is a planar asymmetric antenna structure with shifted feed position comprising two elliptically tapering right and left arms, each with a different radius, and an off-center teed point positioned between the right and left arms.

18. The method of claim 17 wherein the multiprotocol antenna pattern is configured to concurrently support both WiMAX and WiFi operations.

* * * * *

UNITED STATES PATENT AND TRADEMARK OFFICE
CERTIFICATE OF CORRECTION

PATENT NO.        : 8,368,601 B2                                Page 1 of 1
APPLICATION NO.   : 12/536132
DATED             : February 5, 2013
INVENTOR(S)       : Suh et al.

It is certified that error appears in the above-identified patent and that said Letters Patent is hereby corrected as shown below:

On the Title page, in column 1, under Item "(75) Inventors", line 3, delete "S" and insert --S.--, therefor In the Claims In column 7, line 29, in claim 11, delete "fiat" and insert --flat--, therefor In column 8, line 56, in claim 17, delete "teed" and insert --feed--, therefor Signed and Sealed this
Second Day of December, 2014

Michelle K. Lee
*Deputy Director of the United States Patent and Trademark Office*